US010550260B2

(12) United States Patent
Cochran et al.

(10) Patent No.: US 10,550,260 B2
(45) Date of Patent: Feb. 4, 2020

(54) IMPACT MODIFIED STYRENIC POLYMERS WITH IMPROVED ENVIRONMENTAL STRESS CRACK RESISTANCE PROPERTIES

(71) Applicant: INEOS STYROLUTION GROUP GMBH, Frankfurt am Main (DE)

(72) Inventors: Thomas W. Cochran, Channahon, IL (US); John A. Morris, Shorewood, IL (US)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 30 days.

(21) Appl. No.: 15/558,293

(22) PCT Filed: Mar. 17, 2016

(86) PCT No.: PCT/EP2016/055775
§ 371 (c)(1),
(2) Date: Sep. 14, 2017

(87) PCT Pub. No.: WO2016/146729
PCT Pub. Date: Sep. 22, 2016

(65) Prior Publication Data
US 2018/0057681 A1  Mar. 1, 2018

(30) Foreign Application Priority Data

Mar. 18, 2015  (EP) .................... 15159727

(51) Int. Cl.
*C08L 51/04* (2006.01)
*F25D 23/06* (2006.01)

(52) U.S. Cl.
CPC ............ *C08L 51/04* (2013.01); *F25D 23/066* (2013.01); *C08L 2205/035* (2013.01); *C08L 2207/066* (2013.01)

(58) Field of Classification Search
CPC .................................................. C08L 2205/035
See application file for complete search history.

(56) References Cited

U.S. PATENT DOCUMENTS

| | | | |
|---|---|---|---|
| 4,929,680 A | 5/1990 | Matsubara et al. | |
| 5,543,461 A | 8/1996 | Nke-Aka et al. | |
| 5,861,455 A | 1/1999 | Reddy et al. | |
| 6,593,430 B1 * | 7/2003 | Knoll | C08F 297/04 525/271 |
| 6,613,837 B2 | 9/2003 | Reddy et al. | |
| 2010/0240834 A1 | 9/2010 | Cochran et al. | |
| 2011/0269858 A1 * | 11/2011 | Schips | C08L 25/06 521/57 |

* cited by examiner

*Primary Examiner* — Jeffrey C Mullis
(74) *Attorney, Agent, or Firm* — J.A. Lindeman & Co. PLLC; Jeffrey Lindeman; Aaron Raphael

(57) ABSTRACT

Polymer blends comprising components A), B) and C): A) 80 to 96% by weight of an impact modified styrenic polymer A), B) 1 to 7% by weight of a polymer blend B) comprising B1) 25 to 75% by weight of polyisobutylene and B2) 25 to 75% by weight of a polyolefin, C) 3 to 13% by weight of an elastomeric block copolymer C) of structure $(A\text{-}(B/A))_n\text{-}A$, where A is a vinylaromatic block, (B/A) is a random copolymer block of vinylaromatic monomer and diene, and n is 1 to 10, exhibit improved environmental stress crack resistance properties in presence of hydrofluoro olefins.

19 Claims, No Drawings

IMPACT MODIFIED STYRENIC POLYMERS WITH IMPROVED ENVIRONMENTAL STRESS CRACK RESISTANCE PROPERTIES

The invention is directed to polymer blends comprising impact modified styrene polymers, and in particular to polymer blends, comprising high impact modified polystyrene resins, in solid form, that exhibit improved environmental stress crack resistance properties in the presence of olefinic unsaturated blowing agents, such as hydrofluoro olefins (HFO). The invention is further deals with a process for the preparation and to their use in hydrofluoro olefin containing areas and in cooling apparatuses.

The refrigeration industry uses polyurethane foam for heat insulation between the outer metal cabinet and the inner plastic liner. The polyurethane requires a blowing agent to generate the foam. The choice of a blowing agent is a complicated matter that depends on many factors including thermal conductivity, cost, flammability, toxicity, and environmental factors such as ozone depletion and global warming potential.

In regard to the environmental factors, particularly global warming potential, a new class of blowing agents was developed that contains olefinic unsaturation. The unsaturation in the structure of these so-called HFOs (hydrofluoro olefins) cause them to readily decompose in the atmosphere in a matter of days rather than hundreds of years, thereby minimizing harmful global warming. However, although these HFO blowing agents have some appealing advantages, they appear to be more susceptible to cause environmental stress cracks and damage to the polystyrene that typically comprises the inner liner of a refrigerator.

US 2010/0240834 discloses impact modified styrenic polymers that exhibit improved environmental stress crack resistance if exposed to food based on oily or fatty substances. Said styrene polymers are prepared by combining 95 to 99.5 wt. % of an impact modified styrenic polymer with 0.5 to 5 wt. % of a polymer solution containing 25 to 75 wt. % polyisobutylene (PIB) and 25 to 75 wt. % of a polyolefin comprising one or more $C_2$ to $C_{12}$ alpha olefins. Solutions are preferred having a PIB content of from 60 to 66 wt.-% in linear low density polyethylene.

The impact modifying polymer in the impact modified styrene polymer is a rubbery polymer, in particular a polybutadiene (PB). Blends with further polymers or the use of said impact modified styrenic polymers in cooling apparatuses or their resistance to refrigerator insulation blowing agents are not mentioned.

The formation of aggressive environmental stress cracks due to the presence of HFO against polystyrene and its potential to reduce the lifetime of polystyrene inner liners in cooling apparatuses is the problem addressed by the present invention.

It is an object of the invention to provide impact modified styrenic polymers suitable for inner liners of cooling apparatuses that exhibit improved environmental stress crack resistance (ESCR) properties in presence of aggressive olefinic unsaturated blowing agents, in particular in presence of hydrofluoro olefins (HFO).

It was surprisingly found that the problem can be solved by providing polymer blends comprising (or consisting of) components A), B) and C):

A) 80 to 96% by weight of an impact modified styrenic polymer A) comprising a styrenic polymer and an impact modifying polymer, in particular high impact polystyrene (HIPS), B) 1 to 7% by weight of a polymer blend B) comprising (or consisting of)
  B1) 25 to 75% by weight (based on B) of polyisobutylene and
  B2) 25 to 75% by weight (based on B) of a polyolefin made from one or more $C_2$ to $C_{12}$ alpha olefins being different from B1), in particular LDPE or LLDPE, C) 3 to 13% by weight of an elastomeric block copolymer C) of the structure

$(A-(B/A))_n-A$, where A is a vinylaromatic block forming a hard phase, (B/A) is a random copolymer block of vinylaromatic monomer and of diene forming a soft phase, and n are natural numbers from 1 to 10, wherein the elastomeric block copolymer has a monomer composition comprising 25-60% by weight (based on C) of diene and 75-40% by weight (based on C) of vinylaromatic compound, the glass transition temperature Tg of block A is above 25° C. and that of block (B/A) is below 25° C., and the proportion of the hard phase in the elastomeric block copolymer C) is from 5 to 40% by volume and the relative amount of 1,2 linkages of the polydiene, based on the sum of 1,2- and 1,4-cis/trans-linkages, is less than 15%.

The sum of components A) to C) of the polymer blend totals 100% by weight. In principle, it is possible to use further common additives D, e.g. in an amount of 0.1 to 5% by weight. The glass transition temperature ($T_g$) can be measured by methods known to the polymer chemist.

In the afore-mentioned inventive polymer blend, the sum of components B1) and B2) totals 100% by weight, based on component B).

In the afore-mentioned inventive polymer blend, the sum of the monomer components of the elastomeric block copolymer C) totals 100% by weight, based on component C).

In addition, the inventive polymer blend may optionally comprise further additives and/or auxiliaries (e.g. plastic processing aids) D) such as plasticizers, waxes, antioxidants, mineral oil, silicone oil, stabilizers, flame-retardants, mineral fibers, carbon fibers, mineral fillers, dyes, pigments and the like. Said additives D) may optionally be present in the inventive polymer blend in low amounts, such as 0.1 to 5 parts by weight, preferably 0.1 to 3 parts by weight, per 100 parts by weight of the inventive polymer blend comprising components A), B) and C).

Preferably the afore-mentioned inventive polymer blend does not comprise further additives and/or auxiliaries D.

As used herein, the term "inventive polymer blend" or "polymer blend of the invention" refers to a polymer blend comprising (or consisting of) components A), B) and C) as hereinbefore defined.

As used herein, the term "elastomeric" refers to a material that deforms when stress is applied and returns to its original configuration when the stress is removed.

As used herein, the term "high impact polystyrene" or "HIPS" refers to rubber modified polystyrene, a non-limiting example of which includes HIPS prepared by adding polybutadiene, or other elastomeric materials, to styrene monomer during polymerization so it can become chemically bonded to the polystyrene, forming a graft copolymer which helps to incorporate impact modifying polymers into the final resin composition.

As used herein, the term "impact modifying polymer" refers to elastomeric materials that can be used to make impact modified and/or high impact polystyrene and include, without limitation, polymeric materials containing monomer residues from styrene, 1,3-butadiene, isoprene, acrylonitrile, ethylene, $C_3$ to $C_{12}$ alpha olefins, and combinations thereof.

Unless otherwise specified, all molecular weight values are determined using gel permeation chromatography (GPC) using appropriate polystyrene standards. Unless otherwise indicated, the molecular weight values indicated herein are weight average molecular weights (Mw).

As used herein, the term "monomer residues" refers to the monomeric repeat unit in a polymer derived from addition polymerization of a molecule containing a polymerizable unsaturated group. As used herein, the term "polymer" is meant to encompass, without limitation, homopolymers, copolymers and graft copolymers.

As used herein, the terms "polyisobutylene" or "PIB" refer to a polymer derived from one or more monomers according to the formula $CH_2CR^3R^2$, where $R^3$ is a $C_1$-$C_3$ alkyl group and $R^2$ is a $C_1$-$C_{22}$ linear, branched or cyclic alkyl group. Polyisobutylene comprising or preferably consisting of monomer residues from 2-methyl-1-propene (=isobutylene) monomers is in particular preferred.

As used herein, the term "polyolefin" refers to a polymer derived from one or more α-olefin monomers according to the formula $CH_2CHR^2$, where $R^2$ is H or a $C_1$-$C_{22}$ linear, branched or cyclic alkyl group and includes without limitation polyethylene, low density polyethylene (LDPE), linear low density polyethylene (LLDPE), substantially linear ethylene polymers, high density polyethylene and polypropylene.

As used herein, the term "styrenic polymer" refers to a polymer that contains residues from one or more monomers selected from styrene, p-methyl styrene, tertiary butyl styrene, dimethyl styrene, nuclear brominated or chlorinated derivatives thereof and combinations thereof.

As used herein the term "olefinic unsaturated blowing agents" refers to hydrofluoroolefins (HFO) and includes, without limitation, one or more compounds selected from 2,3,3,3-tetrafluoropropene, 1,3,3,3-tetrafluoropropene and in particular 1-chloro-3,3,3-trifluoropropene.

Component A

In embodiments of the present invention, the styrenic polymer contains monomer residues from styrenic monomers selected from styrene, p-methyl styrene, tertiary butyl styrene, dimethyl styrene, nuclear brominated or chlorinated derivatives thereof and combinations thereof, styrene being preferred. As described herein, the particular styrenic polymer used will depend on the nature of the other components of the inventive polymer blend in order to provide the desired stress crack resistance. Chain length of the styrenic polymer typically ranges from a weight average molecular weight (Mw) of 150,000 to 260,000.

In embodiments of the invention, the impact modifying polymer in the impact modified styrenic polymer A) contains monomer residues selected from styrene, 1,3-butadiene, isoprene, acrylonitrile, ethylene, $C_3$ to $C_{12}$ alpha olefins, and combinations thereof.

In particular embodiments of the invention, the impact modifying polymer can be a rubbery polymer containing an ethylenic unsaturation. In some cases, the impact modifying polymer can be a co- or homo-polymer of one or more $C_{4-6}$ conjugated diolefins. In some particular embodiments, the impact modifying polymer includes or can be polybutadiene.

The polybutadiene can be a medium or high cis-polybutadiene. Typically the high cis-polybutadiene contains not less than 90%, in some cases more than about 93 weight % of the polymer in the cis-configuration. In many instances, medium cis-polybutadiene has a cis content from about 30 to 50, in some cases from about 35 to 45 weight %.

Suitable polybutadiene rubbery polymers that can be used in the invention include, but are not limited to, those commercially available from a number of sources; non-limiting examples including Buna CB 550 available from Lanxess Corporation (Pittsburgh, Pa.); PB 5800-Schkopau available from the Trinseo LLC (Berwyn, Pa.); and Diene® 55AC15 and Diene® 70AC15 available from Firestone Polymers, LLC (Akron, Ohio).

In particular embodiments of the invention, the impact modifying polymer can include one or more block copolymers, which can be rubbery block copolymers. In some cases, the block copolymers include one or more di-block and tri-block copolymers of styrene-butadiene, styrene-butadiene-styrene, styrene-isoprene, styrene-isoprene-styrene and partially hydrogenated styrene-isoprene-styrene. Examples of suitable block copolymers include, but are not limited to, the STEREON® block copolymers available from Firestone; the ASAPREN E™ block copolymers Tufprene® elastomers available from Asahi Kasei Chemicals Corporation, Tokyo, Japan; the KRATON® block copolymers available from Kraton Polymers, Houston, Tex.; and the VECTOR® block copolymers available from Dexco Polymers LP, Houston, Tex., non-limiting examples of such include Asahi's Tufprene® A, Dexco's Vector® 6241, and Kraton's D1155BJ.

In other particular embodiments of the invention, the block copolymer can be a linear or radial block copolymer.

In many embodiments of the invention, the block copolymer can have a weight average molecular weight (Mw) of at least 50,000 and in some cases not less than about 75,000, and can be up to 500,000, in some cases up to 400,000 and in other cases up to 300,000. The weight average molecular weight of the block copolymer can be any value or can range between any of the values recited above. In some embodiments of the invention, the block copolymer can be a triblock styrene-butadiene-styrene or styrene-isoprene-styrene copolymer having a weight average molecular weight of from about 175,000 to about 275,000.

As described herein, the particular impact modifying polymer used will depend on the nature of the other components of the inventive polymer blend in order to provide the desired stress crack resistance. Polybutadiene rubber is in particular preferred.

In particular embodiments of the invention, the impact modified styrenic polymer A) can include PS 6210, PS 6220, PS 5400, PS 2710, PS 7120, PS 5300, PS 5410, all available from Styrolution, Aurora, Ill. As described herein, the particular impact modified styrenic polymer A) used will depend on the nature of the other components of the inventive polymer blend in order to provide the desired stress crack resistance. The impact modified styrenic polymer A), in particular HIPS, can be prepared by polymerizing the afore-mentioned styrenic monomers in the presence of the impact modifying polymer as a non-limiting example, according to the methods disclosed in U.S. Pat. No. 5,543,461 (see col. 5, l. 3 to 42), U.S. Pat. No. 5,861,455 (see col. 3, l. 42 to col. 4, l. 17) and U.S. Pat. No. 6,613,837 (see col. 3, l. 55 to col. 4, l. 23), the relevant portions of which are herein incorporated by reference.

The impact modified styrenic polymer A) preferably comprises 85 to 96% by weight of the styrenic polymer, preferably polystyrene, and 4 to 15% by weight of the impact modifying polymer, preferably polybutadiene.

The impact modifying polymer particles in the impact modified styrenic polymers A) typically have an average particle size (measured by common methods) of at least about 1 µm, in some cases at least about 1.5 µm and in other cases at least about 2 µm and can be up to about 12 µm, in some cases up to about 11 µm and in other cases up to about 10 µm. The particle size of the impact modifying polymer particles in the impact modified styrenic polymers A) can be any value or range between any of the values recited above. The impact modifying polymer particle size is typically measured by analyzing the spectra obtained from light scattering through a solution of the particles in a polystyrene solvent such as methyl ethyl ketone or ethyl acetate. Instruments suitable for this measurement include Horiba's Model LA-920 or Beckman Coulter's LS 13 320.

The impact modified styrenic polymer A), in particular HIPS, can be present in the inventive polymer blend at a level of at least about 80, in some cases at least about 81, in other cases at least about 82 and in some instances at least about 83 or even at least 84 percent by weight of the overall polymer blend. Also, the impact modified styrenic polymer, in particular HIPS, can be present at a level of up to 96, in some cases up to 95, in other cases up to 94 and in some instances up to 93 percent by weight of the overall inventive polymer blend. The amount of impact modified styrenic polymer A), in particular HIPS, in the polymer blend of the present invention can be any value or range between any of the values recited above.

Component B

In particular embodiments of the invention, the PIB component B1) of polymer blend B) can be a polymer prepared by polymerizing isobutylene.

In embodiments of the invention, the PIB component B1) can have a number average molecular weight (Mn) of at least about 900, in some cases at least about 950, and in other cases at least about 1000 and up to about 2500, in some cases up to about 2000, in other cases up to about 1500 and in some instances up to about 1300. As described herein, the particular PIB component B1) used will depend on the nature of the other components of the inventive polymer blend in order to provide the desired stress crack resistance.

The PIB component B1) can be present in the polymer blend of the present invention at a level of at least about 0.25, in some cases at least about 0.5, in other cases at least about 0.75 and in some instances at least about 1 percent by weight of the overall inventive polymer blend. Also, the PIB component B1) can be present in the polymer blend of the present invention at a level of up to about 5.25, in some cases up to about 4.25, in other cases up to about 3.50 and in some instances up to about 2.75 percent by weight of the overall inventive polymer blend. The amount of the PIB component B1) in the inventive polymer blend will vary based on the concentration of the PIB component B1) in the polymer blend B), the nature of the polyolefin B2), the nature of the impact modified styrenic polymer A), in particular HIPS, the nature of the elastomeric block copolymer C) and the particular stress crack resistance properties desired. The amount of the PIB component B1) in the inventive polymer blend can be any value or range between any of the values recited above.

In the present invention, a polyolefin B2) is used as a carrier resin to deliver the PIB component B1) to the impact modified styrenic polymer A), in particular HIPS, to provide together with the elastomeric block copolymer C) an improved stress crack resistance. Thus, component B) is preferably used as a concentrated blend B) of PIB component B1) in the polyolefin B2) for subsequent blending with the impact modified styrenic polymer A) and the elastomeric block copolymer C) and optionally further additives and/or auxiliaries D).

Component B) is preferably a master batch concentrate of PIB component B1) in a polyolefin B2) in order to convert the difficult to process liquid PIB into easier to process coarse solid particles.

In preferred embodiments of the invention, a polymer blend B) of PIB component B1), in particular polyisobutylene, in linear low (LLDPE) or low density polyethylene (LDPE) as component B2) is used.

Polymer blends B) having a PIB—in particular polyisobutylene—content of from 60% to 66% by weight in linear low density polyethylene are available commercially from, as non-limiting examples, Polytechs S.A.S. (Cany Barville, France) or Compound Solutions (Twinsburg, Ohio) as PW60 and PW66, and from Colortech (Brampton, Ontario, Canada) as Cling Concentrate 103590-41.

The PIB component B1)—in particular polyisobutylene—can be present in the polymer blend B) of the present invention at a level of at least about 25, in some cases at least about 35, in other cases at least about 50 and in some instances at least about 60 percent by weight of the overall polymer blend B). Also, the PIB component B1 can be present in the polymer blend B) of the present invention at a level of up to about 75, in some cases up to about 70, in other cases up to about 68 and in some instances up to about 66 percent by weight of the overall polymer blend B). The amount of the PIB component B1) in the polymer blend B) varies based on the nature of the PIB B1), the nature of the polyolefin B2), the viscosity of the polymer blend B) and the tackiness of the polymer blend B). The amount of PIB in the polymer blend B) in the present invention can be any value or range between any of the values recited above.

The polyolefin B2) can be present in the polymer blend B) of the present invention at a level of at least about 25, in some cases at least about 30, in other cases at least about 32 and in some instances at least about 34 percent by weight of the overall polymer blend B). Also, the polyolefin B2) can be present in the polymer blend B) of the present invention at a level of up to about 75, in some cases up to about 65, in other cases up to about 50 and in some instances up to about 40 percent by weight of the overall polymer blend B). The amount of polyolefin B2) in the polymer blend B) varies based on the nature of the PIB component B1), the nature of the polyolefin B2), the viscosity of the polymer blend B) and the tackiness of the polymer blend B). The amount of polyolefin B2) in the polymer blend B) in the present invention can be any value or range between any of the values recited above.

Component (polymer blend) B) can be present in the inventive polymer blend at a level of at least about 1, in some cases at least about 1.5, in other cases at least about 2 and in some instances at least about 2.5 percent by weight of the overall inventive polymerblend. Also, the polymer blend B) can be present in the inventive polymer blend at a level of up to about 7, in some cases up to about 6.5, in other cases up to about 6 and in some instances up to about 5.5 percent by weight of the overall inventive polymer blend. The amount of polymer blend B) in the inventive polymer blend will vary based on the concentration of the PIB component B1) in the polymer blend B), the nature of the polyolefin B2), the nature of the impact modified styrenic polymer A), in particular HIPS, the nature of the elastomeric block copolymer C), and the particular stress crack resistance properties desired. The amount of polymer blend B) in the inventive polymer blend can be any value or range between any of the values recited above.

The polymer blend B) can be prepared by kneading and extruding in a single screw extruder in the manner described by U.S. Pat. No. 4,929,680.

Component C

Suitable elastomeric block copolymers C) for the inventive polymer blend are: block copolymers of the structure (A-(B/A))$_n$-A, where A is a vinylaromatic—in particular styrene—block forming a hard phase, (B/A) is a random copolymer block of vinylaromatic monomer—in particular styrene—and of diene—in particular 1,3-butadiene—forming a soft phase, and n are natural numbers from 1 to 10, preferably 1 to 4, wherein the elastomeric block copolymer has a monomer composition comprising 25-60% by weight of diene, in particular 1,3-butadiene, and 75-40% by weight of vinylaromatic compound, in particular styrene, the glass transition temperature Tg of block A is above 25° C. and that of block (B/A) is below 25° C., and the proportion of the hard phase in the elastomeric block copolymer is from 5 to 40% by volume and the relative amount of 1,2 linkages of the polydiene, based on the sum of 1,2- and 1,4-cis/trans-linkages, is less than 15%, preferably less than 12%.

The block polymers C) are prepared by anionic polymerization in a nonpolar solvent, initiation being effected by means of organometallic compounds. Compounds of the alkali metals, in particular of lithium, are preferred. Examples of initiators are methyl-lithium, ethyllithium, propyllithium, n-butyllithium, sec-butyllithium and tert-butyllithium. The organometallic compound is added as a solution in a chemically inert hydrocarbon. The dose depends on the intended molecular weight of the polymer but is, as a rule, from 0.002 to 5 mol %, based on the monomers. Preferably used solvents are aliphatic hydrocarbons, such as cyclohexane and methylcyclohexane.

The random blocks of the block copolymers C), which blocks simultaneously contain vinylaromatic and diene, are prepared with the addition of a soluble potassium salt, in particular of a potassium alcoholate. Preferred potassium alcoholates are tertiary alcoholates of at least 7 carbon atoms and typical corresponding alcohols are, for example, 3-ethyl-3-pentanol and 2,3-dimethyl-3-pentanol in particular Tetrahydrolinalool (3,7-dimethyl-3-octanol). In the case of alkyllithium-initiated polymerization in a nonpolar solvent such as cyclohexane, the molar ratio of lithium to potassium is from about 10:1 to 40:1.

The preparation of elastomeric block copolymers C) is described in detail in U.S. Pat. No. 6,197,889.

A preferred block copolymer C) is one of the general formulae A-(B/A)-A, and a particularly preferred block copolymer is one whose soft phase is divided into blocks (B/A)$_1$-(B/A)$_2$; (B/A)$_1$-(B/A)$_2$-(B/A)$_1$; (B/A)$_1$-(B/A)$_2$-(B/A)$_3$; where the blocks have different compositions or their vinylaromatic/diene ratio in the individual blocks (B/A) changes in such a way that a composition gradient (B/A)$_{p1}$<<(B/A)$_{p2}$<<(B/A)$_{p3}$ . . . occurs in each segment (part-block), the glass transition temperature Tg of each part-block being less than 25° C. Such block copolymers which have within a block (B/A), for example, p repeating segments (part-blocks) with changing monomer composition can be formed by addition of p portions of the monomers, where p is an integer from 2 to 10.

A block copolymer which has a plurality of blocks (B/A) and/or A, each having a different molecular weight per molecule, is likewise preferred.

Preferred vinylaromatic compounds are styrene and furthermore alpha-methylstyrene and vinyltoluene and mixtures of these compounds. Suitable dienes are conjugated dienes preferably 1,3-butadiene and isoprene, and furthermore piperylene, 1-phenylbutadiene and mixtures of these compounds. A particularly preferred monomer combination comprises 1,3-butadiene (=butadiene) and styrene.

The (B/A) block is composed of, for example, 75 to 40% by weight of styrene and 25 to 60% by weight of butadiene. Particularly preferably, the (B/A) block has a butadiene content of from 35 to 70% and a styrene content of from 65 to 30%.

In the case of the monomer combination styrene/butadiene, the amount by weight of the diene in the total block copolymer is 15-65% by weight and that of the vinylaromatic component is accordingly 85-35% by weight. Butadiene/styrene block copolymers having a monomer composition comprising 25-60% by weight of diene and 75-40% by weight of vinylaromatic compound are particularly preferred.

The amount by volume of the soft phase composed of diene and vinylaromatic sequences in the solid is 60-95, preferably 70-90, particularly preferably 80-90,% by volume. The blocks A formed from the vinylaromatic monomers form the hard phase, the amount by volume accordingly accounts for 5-40, preferably 10-30, particularly preferably 10-20,% by volume.

The amount by volume of the two phases can be measured by high-contrast electron microscopy or solid-state NMR spectroscopy. The amount of the vinylaromatic blocks can be determined by precipitation and weighing after osmium degradation of the polydiene fraction. The future phase ratio of a polymer can also be calculated from the amounts of monomers used if complete polymerization is permitted in each case.

The molecular weight of block A is in general from 1000 to 200,000, preferably from 3000 to 80,000, g/mol. Within a molecule, blocks A may have different molecular weights.

The molecular weight of the block (B/A) is usually from 2000 to 250,000, preferably from 5000 to 150,000, g/mol. As in the case of a block A, a block (B/A), too, may have different molecular weights within a molecule.

Very particular preferred block copolymers C) according to the present invention are linear styrene-butadiene block copolymers of the general structure A-(B/A)-A having, situated between the two styrene A blocks, one or more (B/A)-random blocks having random styrene/butadiene distribution. The afore-mentioned linear styrene-butadiene block copolymers are commercially available as Styroflex® 2G 66 from Styrolution, Germany.

The polymer blend can be obtained by compounding the components A), B) and C) and, if present, optional additives and/or auxiliaries D) using single screw extrusion, twin screw extrusion, or any other technique that is typically used to compound further components, blends, masterbatches and/or additives into impact modified styrenic polymers, in particular HIPS.

According to one embodiment of the invention in a first optional step a pre-mixture of components A) to C) and, if present, of optional components D) can be prepared using a conventional mixing apparatus such as a tumbler to obtain a uniformly mixed material. Then said mixture is extrusion blended or compounded in a high intensity blender such as a Banbury Mixer or a single- or twin-screw-extruder.

According to one further embodiment components A) to C) and, if present, optional components D) are extrusion blended or compounded without a pre-mixing step.

Preferably the inventive polymer blend comprises (or consists of) components A) to C) in the following amounts:
- A) 84 to 94% by weight of the impact modified styrenic polymer A) comprising (or consisting of) a styrenic polymer and an impact modifying polymer, in particular HIPS;
- B) 1.5 to 6.5% by weight of a polymer blend B) comprising (or consisting of)
  - B1) 25 to 75%, preferably 35 to 70%, more preferably 50 to 68%, most preferably 60 to 66% by weight of polyisobutylene B1) and
  - B2) 25 to 75%, preferably 30 to 65%, more preferably 32 to 50%, most preferably 34 to 40% by weight of the polyolefin B2), in particular LDPE and/or LLDPE,
- C) 4 to 11% by weight of the elastomeric block copolymer C).

More preferably the inventive polymer blend comprises (or consists of) components A) to C) in the following amounts:
- A) 84.5 to 93% by weight of the impact modified styrenic polymer A) comprising (or consisting of) a styrenic polymer and an impact modifying polymer, in particular HIPS;
- B) 2 to 6% by weight of a polymer blend B) comprising (or consisting of)
  - B1) 25 to 75%, preferably 35 to 70%, more preferably 50 to 68%, most preferably 60 to 66% by weight of polyisobutylene B1) and
  - B2) 25 to 75%, preferably 30 to 65%, more preferably 32 to 50%, most preferably 34 to 40% by weight of the polyolefin B2), in particular LDPE and/or LLDPE,
- C) 4.5 to 10.5% by weight of the elastomeric block copolymer C).

In particular preferred the inventive polymer blend comprises (or consists of) components A) to C) in the following amounts:
- A) 85 to 92.5% by weight of the impact modified styrenic polymer A) comprising (or consisting of) a styrenic polymer and an impact modifying polymer, in particular HIPS;
- B) 2.5 to 5.5% by weight of a polymer blend B) comprising (or consisting of)
  - B1) 25 to 75%, preferably 35 to 70%, more preferably 50 to 68%, most preferably 60 to 66% by weight of polyisobutylene B1) and
  - B2) 25 to 75%, preferably 30 to 65%, more preferably 32 to 50%, most preferably 34 to 40% by weight of the polyolefin B2), in particular LDPE and/or LLDPE,
- C) 5 to 10% by weight of the elastomeric block copolymer C).

Preferred among the afore-mentioned inventive polymer blends are those, wherein the elastomeric block copolymer C) is a styrene/butadiene block copolymer of the structure A-(B/A)-A having, situated between the two styrene A blocks, one or more (B/A)-random blocks having random styrene/butadiene distribution.

Furthermore preferred among the afore-mentioned inventive polymer blends are those wherein in component A) the styrenic polymer is polystyrene and the impact modifying polymer is polybutadiene.

The inventive polymer blends typically have an improved environmental stress crack resistance (ESCR) in comparison to materials according to the prior art, as measured on injection molded tensile bars at constant external stress with exposure to liquid hydrofluoroolefins.

In embodiments of the invention, the polymer blends of the invention typically have a tensile elongation at break measured according to ASTM D638 of at least 18%, in some cases at least about 21%, in other cases at least about 24% and in particular embodiments at least about 33%.

In embodiments of the invention, the polymer blends of the invention typically have a modulus of elasticity measured according to ASTM D638 of at least 175 kpsi, in some cases at least about 190 kpsi, in other cases at least about 200 kpsi and in particular embodiments at least about 210 kpsi.

The inventive polymer blends can be used for the preparation of shaped articles for various applications. The shaped articles can be formed by extrusion, injection molding or other usual techniques for processing plastics.

A further subject of the invention is the use of the inventive polymer blend in hydrofluoro-olefin containing areas. Due to its improved environmental stress crack resistance in presence of hydrofluoroolefins the inventive polymer blend can be advantageously used as a material for cooling apparatuses, in particular as an inner liner of a refrigerator.

A further subject of the invention is the use of the inventive polymer blend for improving the stress crack resistance of an impact modified styrenic polymer against hydrofluoroolefins.

The present invention is further described by the following examples and claims. Unless otherwise indicated, all percentages are by weight.

EXAMPLES

Materials:
Component A: HIPS 7120 from INEOS Styrolution (Frankfurt, Germany).
Component B: PW60 provided as a concentrated masterbatch by Polytechs, though Compound Solutions, Inc., a 60/40 blend of polyisobutylene in linear low density polyethylene
Component C: Styroflex® 2G 66 from INEOS Styrolution (Frankfurt, Germany), a linear styrene-butadiene triblock copolymer of the structure S-(S/B)-S, the amount of the monomers in the total block copolymer is 35% by weight of butadiene and 65% by weight of styrene; the weight ratio of the blocks is 16/68/16; MFI: 14 (200° C./5 kg) g/10 min.
HFO blowing agent: Honeywell Solstice LGA (trans-1-Chloro-3,3,3-trifluoropropene).

Example 1

Components A, B and C were tumble blended together to obtain a homogeneous mixture and then the obtained mixture was compounded using a Brabender ¾" single screw extruder with a barrel temperature of 200° C. The respective amounts of the components are shown in Table 1.

ASTM Type 1 tensile bars were injection molded from material composed of the formulations in Table 1. The bars were fixed in a curved jig to impose a strain of 1.0% on the outer fibers. The specimens under stress were dipped in liquid HFO for 5 seconds to expose the material to the aggressive stress crack agent. Specimens were then held still under stress for 2 hours at 7.2° C. to allow the liquid blowing agent time to react with the polystyrene. Bars were then conditioned for 24 hours at 23° C. and 50% relative humidity before undergoing testing for tensile properties per ASTM D638.

In the Examples, the tensile elongation at break and modulus of elasticity were measured according to ASTM D638. The results are also tabulated in Table 1.

As the data show, in the absence of both components B) and C), tensile elongation at break (measuring the material toughness) failed to reach even 15%. Similar performance was obtained with addition of component C) alone.

However, when the combination of both components B) and C) were added, ultimate elongation generally exceeded 20% and even reached 33%.

TABLE 1

|  | 1 | 2 | 3A | 3B | 4 |
|---|---|---|---|---|---|
| High impact polystyrene A) | 100.0% | 90.0% | 92.5% | 92.5% | 90.0% |
| PIB Masterbatch B) | 0.0% | 0.0% | 2.5% | 2.5% | 2.5% |
| Styrene-Butadiene Copolymer C) | 0.0% | 10.0% | 5.0% | 5.0% | 7.5% |
| Modulus, psi × 1000 | 220 | 205 | 210 | 200 | 198 |
| Elongation before exposure, % | 43 | 70 | 58 | 60 | 67 |
| Elongation after exposure, % | 10 | 13 | 23 | 21 | 18 |

|  | 5A | 5B | 6 | 7 | 8 |
|---|---|---|---|---|---|
| High impact polystyrene A) | 87.5% | 87.5% | 89.0% | 90.0% | 85.0% |
| PIB Masterbatch B) | 2.5% | 2.5% | 3.5% | 5.0% | 5.0% |
| Styrene-Butadiene Copolymer C) | 10.0% | 10.0% | 7.5% | 5.0% | 10.0% |
| Modulus, psi × 1000 | 190 | 190 | 195 | 190 | 175 |
| Elongation before exposure, % | 69 | 69 | 78 | 29 | 54 |
| Elongation after exposure, % | 20 | 20 | 21 | 24 | 33 |

The inventive polymer blends show an improved crack resistance and enhanced performance against HFO blowing agents.

The invention claimed is:

1. A polymer blend consisting of components A), B), C), and, optionally, D):
   A) 80 to 96% by weight of an impact modified styrenic polymer A), comprising a styrenic polymer and an impact modifying polymer,
   B) 1 to 7% by weight of a polymer blend B), comprising
      B1) 25 to 75% by weight of polyisobutylene, and
      B2) 25 to 75% by weight of a polyolefin, made from one or more $C_2$ to $C_{12}$ alpha olefins, being different from B1),
   C) 3 to 13% by weight of an elastomeric block copolymer C) of structure $(A-(B/A))_n$-A, where A is a vinylaromatic block forming a hard phase, (B/A) is a random copolymer block of vinylaromatic monomer and of diene forming a soft phase, and n are natural numbers from 1 to 10, wherein the elastomeric block copolymer has a monomer composition comprising 25-60% by weight of diene and 75-40% by weight of vinylaromatic compound, the glass transition temperature Tg of block A is above 25° C. and that of block (B/A) is below 25° C., and the proportion of the hard phase in the elastomeric block copolymer C) is from 5 to 40% by volume and the relative amount of 1,2 linkages of the polydiene, based on the sum of 1,2- and 1,4-cis/trans-linkages, is less than 15%, and
   D) 0.1 to 5 parts by weight, per 100 parts by weight of components A), B), and C), of at least one additive, auxiliary, or mixture thereof D) selected from the group consisting of plasticizers, waxes, antioxidants, mineral oil, silicone oil, stabilizers, flame-retardants, mineral fibers, carbon fibers, mineral fillers, dyes, and pigments;
   wherein the sum of components A), B), and C) totals 100% by weight.

2. The polymer blend according to claim 1, wherein components A), B), and C) are present in the following amounts:
   A) 84 to 94% by weight of the impact modified styrenic polymer A), comprising a styrenic polymer and an impact modifying polymer,
   B) 1.5 to 6.5% by weight of a polymer blend B), comprising
      B1) 25 to 75% by weight of polyisobutylene B1), and
      B2) 25 to 75% by weight of the polyolefin B2), and
   C) 4 to 11% by weight of the elastomeric block copolymer C).

3. The polymer blend according to claim 1, wherein components A), B), and C) are present in the following amounts:
   A) 84.5 to 93% by weight of the impact modified styrenic polymer A), comprising a styrenic polymer and an impact modifying polymer,
   B) 2 to 6% by weight of a polymer blend B), comprising
      B1) 25 to 75% by weight of polyisobutylene B1), and
      B2) 25 to 75% by weight of the polyolefin B2), and
   C) 4.5 to 10.5% by weight of the elastomeric block copolymer C).

4. The polymer blend according to claim 1, wherein components A), B), and C) are present in the following amounts:
   A) 85 to 92.5% by weight of the impact modified styrenic polymer A), comprising a styrenic polymer and an impact modifying polymer,
   B) 2.5 to 5.5% by weight of a polymer blend B), comprising
      B1) 25 to 75% by weight of polyisobutylene B1), and
      B2) 25 to 75% by weight of the polyolefin B2), and
   C) 5 to 10% by weight of the elastomeric block copolymer C).

5. The polymer blend according to claim 1, wherein polymer blend B) comprises 35 to 70% by weight of polyisobutylene B1) and 30 to 65% by weight of the polyolefin B2).

6. The polymer blend according to claim 1, wherein polymer blend B) comprises 50 to 68% by weight of polyisobutylene B1) and 32 to 50% by weight of the polyolefin B2).

7. The polymer blend according to claim 1, wherein the elastomeric block copolymer C) is a styrene/butadiene block copolymer of the structure A-(B/A)-A having, situated between the two styrene A blocks, one or more (B/A)-random blocks having random styrene/butadiene distribution.

8. The polymer blend according to claim 1, wherein copolymer C is a block copolymer of the structure S-(S/B)-S.

9. The polymer blend according to claim 1, wherein in component A) the styrenic polymer is polystyrene and the impact modifying polymer is polybutadiene.

10. A process for the preparation of the polymer blends according to claim 1, comprising compounding components A), B), and C) using single- or twin-screw extrusion, or a high intensity blender.

11. A shaped article comprising the polymer blend according to claim 1.

12. A cooling apparatus comprising the polymer blend according to claim 1.

13. A method for improving the stress crack resistance of an impact modified styrenic polymer against hydrofluoroolefins, comprising combining the polymer blend according to claim 1 with the impact modified styrenic polymer.

14. The polymer blend according to claim 1, wherein the impact modified styrenic polymer A) is high impact polystyrene (HIPS).

15. The polymer blend according to claim 1, wherein the polyolefin B2) is LDPE or LLDPE.

16. The method according to claim 12, wherein the polymer blend is an inner liner of a refrigerator.

17. The polymer blend according to claim 2, wherein component D) is not present.

18. The polymer blend according to claim 3, wherein component D) is not present.

19. The polymer blend according to claim 4, wherein component D) is not present.

* * * * *